(12) United States Patent
Toussaint et al.

(10) Patent No.: US 9,236,642 B2
(45) Date of Patent: Jan. 12, 2016

(54) RIGID NEGATIVE COMPARTMENT FOR A METAL-AIR BATTERY AND METHOD OF MANUFACTURING SAID COMPARTMENT

(75) Inventors: Gwenaelle Toussaint, Nemours (FR); Philippe Stevens, Noisy Rudignon (FR); Georges Caillon, Bruges (FR); Patrick Viaud, Margaux (FR); Christophe Cantau, Peyrehorade (FR); Philippe Vinatier, Bordeaux (FR)

(73) Assignees: ELECTRICITE DE FRANCE, Paris (FR); SAFT, Bagnolet (FR); INSTITUT POLYTECHNIQUE DE BORDEAUX, Talence (FR)

( * ) Notice: Subject to any disclaimer, the term of this patent is extended or adjusted under 35 U.S.C. 154(b) by 485 days.

(21) Appl. No.: 13/498,649

(22) PCT Filed: Sep. 22, 2010

(86) PCT No.: PCT/FR2010/051984
§ 371 (c)(1),
(2), (4) Date: Mar. 28, 2012

(87) PCT Pub. No.: WO2011/039449
PCT Pub. Date: Apr. 7, 2011

(65) Prior Publication Data
US 2012/0183880 A1    Jul. 19, 2012

(30) Foreign Application Priority Data
Sep. 30, 2009 (FR) .................................... 09 56772

(51) Int. Cl.
*H01M 10/0562* (2010.01)
*H01M 12/08* (2006.01)
(Continued)

(52) U.S. Cl.
CPC ............ *H01M 12/08* (2013.01); *H01M 2/0207* (2013.01); *H01M 2/0277* (2013.01);
(Continued)

(58) Field of Classification Search
CPC ......................... H01M 10/052; H01M 10/0562
USPC .......................................................... 429/481
See application file for complete search history.

(56) References Cited

U.S. PATENT DOCUMENTS 4,927,717 A * 5/1990 Turley et al. .................. 429/405
5,554,452 A * 9/1996 Delmolino et al. ............. 429/10
(Continued)

FOREIGN PATENT DOCUMENTS

WO    WO 2007/021717    2/2007

OTHER PUBLICATIONS

Thesaurus.com http://thesaurus.com/browse/impervious?p.=3.*
(Continued)

*Primary Examiner* — Stewart Fraser
*Assistant Examiner* — Olatunji Godo
(74) *Attorney, Agent, or Firm* — Vedder Price P.C.; Thomas J. Kowalski; Deborah L. Lu (57) ABSTRACT

The present invention relates to a precursor of a negative electrode compartment for rechargeable metal-air batteries, comprising a rigid casing (1), at least one solid electrolyte membrane (2), a protective covering (5), completely covering the inside face of the solid electrolyte membrane (2), a metallic current collector (3) applied against the inside face of the protective covering (5), preferably also a block (4) of elastic material applied against the current collector and essentially filling the entire internal space defined by the walls of the rigid casing and the solid electrolyte (2), and a flexible electronic conductor (6) passing in a sealed manner through one of the walls of the rigid casing. The present invention also relates to a negative electrode compartment having a rigid casing obtained from said precursor and to a battery containing such a negative electrode compartment.

18 Claims, 4 Drawing Sheets

(51) Int. Cl.
*H01M 2/02* (2006.01)
*H01M 2/30* (2006.01)
*H01M 4/04* (2006.01)
*H01M 4/13* (2010.01)
*H01M 4/1395* (2010.01)
*H01M 4/70* (2006.01)
*H01M 4/72* (2006.01)
*H01M 10/052* (2010.01)

(52) U.S. Cl.
CPC ............ *H01M 2/30* (2013.01); *H01M 4/0438* (2013.01); *H01M 4/13* (2013.01); *H01M 4/1395* (2013.01); *H01M 4/70* (2013.01); *H01M 4/72* (2013.01); *H01M 10/052* (2013.01); *H01M 10/0562* (2013.01); *Y02E 60/122* (2013.01)

(56) References Cited

U.S. PATENT DOCUMENTS

| | | | |
|---|---|---|---|
| 6,485,622 | B1 | 11/2002 | Fu |
| 2005/0095506 | A1 | 5/2005 | Klaassen |
| 2007/0037058 | A1* | 2/2007 | Visco et al. ............... 429/246 |
| 2007/0051620 | A1 | 3/2007 | Visco et al. |
| 2007/0259234 | A1 | 11/2007 | Chua et al. |
| 2008/0268327 | A1 | 10/2008 | Gordon et al. |

OTHER PUBLICATIONS

PCT International Search Report and Written Opinion received in PCT/FR2010/051984.

* cited by examiner

RIGID NEGATIVE COMPARTMENT FOR A METAL-AIR BATTERY AND METHOD OF MANUFACTURING SAID COMPARTMENT

RELATED APPLICATIONS

The present application is filed pursuant to 35 U.S.C. §371 as a U.S. National Phase application of International Patent Application No. PCT/FR2010/051984, which was filed on Sep. 22, 2010, claiming the benefit of priority to French Patent Application No. FR 0956772 filed on Sep. 30, 2009. The entire content of each of the aforementioned applications is incorporated herein by reference in its entirety.

The invention relates to a novel method of manufacturing a rigid negative electrode compartment for metal-air batteries, in particular for lithium-air batteries, to a negative electrode compartment precursor for carrying out this method, to a negative electrode compartment obtained by this method and to a metal-air battery containing such a compartment.

The mass energy density (expressed in Wh/kg) of batteries is still the main limitation for their use in portable equipment, such as portable electronics or electrical vehicles. The energy limitation of these batteries is to a large part due to the performance of the materials of which they are composed. The negative electrode materials currently available generally have a specific capacity of between 300 and 350 Ah/kg. For the materials of the positive electrode, it is of the order of only 100 to 150 Ah/kg.

The advantage of metal-air systems (lithium-air or sodium-air) resides in the use of a positive electrode with infinite capacity. The oxygen consumed by the positive electrode does not need to be stored in the electrode, but can be taken from the ambient air. The capacity of the battery then depends only on the capacity of the negative electrode and the capacity to store the product of the reaction.

The air electrode needs to be a basic or acidic aqueous medium in order to be able to function optimally. Unfortunately, the metallic lithium or metallic sodium used for the negative electrode is too reactive with water and it cannot be formed during recharging in the presence of water, even in the trace state, because the reduction of water takes place at much lower voltages, preventing the formation of lithium or sodium metal. A water-tight physical barrier is therefore necessary between the negative electrode compartment based on lithium or sodium metal and the positive electrode compartment containing an aqueous electrolyte. This water-tight physical barrier must, however, let the metal cations of the aqueous electrolyte pass through to the negative electrode and in the opposite direction.

A family of ceramic materials which satisfy these requirements has been known for some time under the name "Li Super Ionic Conductor" (LISICON) or "Na Super Ionic Conductor" (NASICON). These materials have advantageously high conductivities ranging from $10^{-4}$ to $10^{-3}$ S/cm at 25° C. and have very good chemical stability with respect to the aqueous electrolyte in the positive electrode compartment (air electrode). However, their reactivity with the metallic lithium or sodium in the anodic compartment is very high and it is essential to isolate them from the metallic lithium or sodium by a protective coating, for example based on phosphorus lithium oxynitride (LiPON) glass or sodium phosphorus oxynitride (NaPON) glass.

International Application WO 2007/021717 describes a water-tight negative electrode compartment containing a stack of a current collector, on which a layer of lithium metal is applied as active material, then a water-impermeable ceramic membrane which conducts lithium ions. Leaktightness of this system is ensured by a system of flexible polymer seals (see in particular FIG. 1A of WO 2007/021717). The manufacture of such a compartment involves bonding of the active material (metallic lithium) to the current collector on one side, and to the ceramic membrane on the other side, and has to be carried out in a glovebox or in a dry room, which constitutes a significant constraint. Furthermore, the authors of this application have not demonstrated that the described system is rechargeable. The plastic seals which ensure leaktightness of the system are flexible and provide the ceramic membrane with mobility in order to allow variation of the volume of the compartment due to the consumption and recovery of metallic lithium during the discharging and recharging cycles, respectively. Thus, when the battery is discharged, the ceramic membrane is held only by the slack flexible seals. In order to withstand possible mechanical constraints in the absence of any mechanical support, it must therefore be relatively thick, which is disadvantageous not only in terms of production cost but above all in terms of ionic resistance of this membrane.

Specifically, the electrical efficiency of a cell is partly governed by the resistance of the electrolyte. This specific resistance (R) is expressed by the formula $$R=(r*e)/A,$$

where r denotes the resistivity of the electrolyte, e its thickness and A its surface area. The smaller the thickness of the electrolyte is, the better the energy efficiency of the cell will be.

The Applicant has developed a novel negative electrode compartment which has the advantage over the one described in WO 2007/021717 of having a rigid shell, also referred to below as a rigid casing, instead of flexible seals. In the compartment according to the invention, the solid electrolyte, which is of the same type as that used in WO 2007/021717, is thus held by a rigid structure forming a frame enclosing and stabilizing the solid electrolyte membrane which, by virtue of this, can be provided with much smaller thicknesses. Furthermore, the negative electrode compartment of the present invention is designed so that it can be manufactured in a non-controlled environment, that is to say outside a glovebox or a dry room. This is because the method of manufacturing the negative electrode compartment provides for introduction of the active metal (lithium or sodium) not by bonding or evaporation of a layer of active metal onto the current collector and/or the solid electrolyte, but by an electrochemical reaction which will be described in detail below, during which the lithium metal or the sodium metal does not come in contact with the atmosphere but is formed in situ, inside the airtight and water-tight compartment of the negative electrode.

This novel and advantageous method is carried out on a device which will be referred to below as a "negative electrode compartment precursor". This precursor corresponds to the "empty" negative electrode compartment, that is to say not yet containing the active metal. It is only during an electrochemical reaction step that the active metal is introduced in the form of cations from an aqueous electrolyte, before being reduced by and fixed on the current collector of the anode (negative electrode) while being shielded from humidity and the external atmosphere.

The present invention consequently relates to a negative electrode compartment for rechargeable metal-air batteries, to a method of manufacturing a negative electrode compartment using such a precursor, and to the electrode compartment obtained or obtainable by this method.

The negative electrode compartment precursor of the present invention comprises:
(a) a rigid resin casing open on at least one of its sides,
(b) at least one solid electrolyte membrane that conducts alkali metal ions, which fully closes the open side or sides of the rigid casing in a leaktight manner,
(c) at least one protective coating which is inert with respect to alkali metal ions, covering the inner face of the solid electrolyte membrane preferably fully,
(d) at least one metallic current collector in the form of a sheet, coating or thin plate, applied against or deposited on the inner face of the protective coating, said current collector covering almost all of the inner face of this protective coating but without being in contact with the rigid casing on its edges, and
(e) at least one flexible electronic conductor in the form of a grid or sheet, passing in a leaktight manner through one of the walls of the rigid casing and connected to the current collector.

The rigid casing may have any suitable shape allowing it to be integrated in a metal-air battery. It may, for example, have a parallelepipedal or cylindrical shape. The present description has been provided while taking a casing of parallelepipedal shape as an example.

The rigid casing forming and delimiting, with the solid electrolyte membrane, the negative electrode compartment is made of synthetic resin, preferably a thermoset or cold-cure resin. The chemical nature of this resin is not crucial, so long as it does not interact disadvantageously with the components contained inside the compartment or with the liquid electrolyte of the compartment of the positive electrode. Once cured, the resin should have a sufficient mechanical strength to provide the assembly with the necessary rigidity.

Examples of thermosetting resins which may be mentioned are epoxy resins, unsaturated polyesters, phenolic resins and polyimides. The Applicant has successfully used the coating resin Epofix® marketed by Struers. This is a liquid epoxy resin which cold-cures after adding a crosslinker.

The method of manufacturing the negative electrode compartment precursor by casting a liquid resin into a mold containing the solid electrolyte membrane ensures that the resin walls of the compartment are in leaktight contact with the solid electrolyte and no additional seals will be necessary.

The solid electrolyte membrane is preferably a ceramic membrane which conducts sodium ions or lithium ions, preferably lithium ions.

Such ceramic membranes which conduct metal ions are known and marketed for example under the names Lithium Ion Conducting Glass Ceramic (LIC-GC) by Ohara Inc., Japan. They are ceramics of formula $Li_{1-x}(M,Ga,Al)_x(Ge_{1-y}Ti_y)_{2-x}(PO_4)_3$ where M is one or more metals selected from Nd, Sm, Eu, Gd, Tb, Dy, Ho, Er, Tm and Yb. These types of ceramic membranes are also known in the literature by the name LISICON (Li Super Ionic Conductor).

There are also similar ceramics which conduct sodium ions of formula $Na_{1+x}Zr_2Si_xP_{3-x}O_{12}$ where $0 \leq x \leq 3$. These ceramics which conduct metal ions are described particularly in U.S. Pat. No. 6,485,622 and in the article by N. Gasmi et al, J. of Sol-Gel Science and Technology 4(3), 231-237, and are known in the literature by the name NASICON (Na Super Ionic Conductor).

By virtue of the framing of this ceramic solid electrolyte membrane over its entire periphery by the rigid structure of the casing, the thickness of the solid electrolyte can advantageously be comparatively lower than in a flexible structure of the type described in WO 2007/021717. The solid electrolyte membrane used in the present invention advantageously has a thickness of between 30 μm and 500 μm, preferably between 50 μm and 160 μm. Of course, this thickness may be commensurately smaller when the total surface area of the membrane is less. On the other hand, for surface areas significantly larger than a few cm², the thickness of the membrane must be increased accordingly or the membrane must be reinforced and supported by a reinforcing structure, for example bars or a grid made of resin, which is bonded onto the membrane, this structure leaving the majority of the surface area of the membrane free, that is to say at least 80%, preferably at least 90% of the surface area of the solid electrolyte membrane.

The solid electrolyte membrane is covered over at least a part of its inner surface, and preferably over its entire inner surface (i.e. on its surface facing the interior of the negative electrode compartment) with a protective coating intended to protect the solid electrolyte from the active metal (lithium or sodium) which is introduced into the negative electrode compartment at the time when said compartment is manufactured or on each recharge of the battery. This coating must of course not only be inert with respect to the active metal and the solid electrolyte, but quite clearly, like the solid electrolyte, must also conduct alkali metal ions ($Li^+$, $Na^+$). Although it is not indispensable to protect the entire internal surface of the solid electrolyte membrane, the latter absolutely must be covered with the protective coating on the regions liable to come in contact with the metallic lithium or sodium.

Such coatings are known. Examples which may be mentioned for coatings which conduct lithium ions are coatings based on $Li_3N$, $Li_3P$, LiI, LiBr, LiF, lithium phosphorus oxynitride (LiPON) (see, for example, X. Yu et al., *J. Electrochem. Soc.* (1997) 144(2), page 524), and examples which may be mentioned for coatings which conduct sodium ions are coatings based on glass, for example a borosilicate glass with addition of $Na_2O$ or of sodium phosphorus oxynitride (NaPON) (see, for example, S. Chun et al., *Proc. 124th Meeting Electrochem Soc.*, (2008), 195). Among these coatings, in particular, LiPON is preferred for lithium-air batteries and NaPON for sodium-air batteries. It is clear that protective coatings which conduct lithium ions must be used in combination with a solid electrolyte which conducts lithium, and protective coatings which conduct sodium must be used in combination with a solid electrolyte which conducts sodium ions.

This coating is arranged on the solid electrolyte membrane before casting the resin which, after curing, will form the rigid casing. When this protective coating covers the entire surface of the solid electrolyte membrane, it is consequently held like the latter over its entire periphery in the resin, thus forming a leaktight screen between the solid electrolyte membrane and the inner space of the rigid compartment intended to receive the active metal.

A metallic current collector in the form of a sheet, coating or thin plate is applied or deposited directly on the protective coating, for example by sputtering. This metallic current collector is preferably deposited on the protective coating before casting and curing the resin forming the rigid casing.

The current collector may be made of any metal which is stable in air and allows good electronic conduction when it is deposited in a thin layer. A current collector made of stainless steel will preferably be used in the present invention.

Although the current collector covers almost the entire free face of the protective coating, it is important to take care that this covering is not total and that the current collector is not in physical contact with the walls of the rigid casing. This is because at the time when the negative electrode compartment is manufactured from the precursor described here, the active metal will be introduced, via the solid electrolyte and the protective coating, and will be deposited in a layer of uniform thickness on the current collector, between the latter and the protective coating. During this introduction of the active metal, given that the position of the protective coating is fixed, the current collector will be progressively displaced, moving away from the protective coating, as the thickness of the active metal deposit increases. If the current collector was then in contact with the walls, even at only a few positions, it would risk deforming or breaking. The distance between the edges of the current collector and the inner face of the walls of the rigid casing is preferably at most equal to a few millimeters.

The current collector is electrically connected to a flexible electronic conductor formed by a flexible metallic grid or sheet, preferably a flexible steel grid. This flexible metallic grid covers at least a part, and preferably all, of the surface of the current collector, in which case it also fulfils a mechanical support function for the current collector. In order to improve the electrical contact between the current collector and the electronic conductor, a silver varnish is preferably applied on the contact region. In order for this to be possible, the sixth face of the rigid casing, that is to say the one which lies opposite that formed by the electrolyte membrane, will not be cast until after assembling all the other components of the precursor. The method of manufacturing the rigid negative electrode compartment precursor will be described in more detail in example 1.

The negative electrode compartment precursor of the present invention furthermore comprises at least one block of resilient material applied against the current collector and filling essentially all of the inner space defined by the walls of the rigid casing and the solid electrolyte, said block exerting, owing to its resilience, a slight pressure on the current collector so as to keep it applied against the solid electrolyte membrane.

This block of resilient material is preferably a resilient foam and has dimensions such that it fills essentially all of the inner space of the negative electrode compartment precursor of the present invention. This block of resilient material is not essential for the present invention, but simply corresponds to one particular embodiment. Specifically, the negative electrode compartment may function in the absence of such a material, which essentially has the purpose of supporting the current collector over its entire surface and of exerting a slight pressure on it so as to press it toward the solid electrolyte membrane.

As already mentioned above, the current collector will move progressively away from the solid electrolyte membrane during the phase of introducing the active metal. The block of foam will then be compressed while also progressively exerting a uniform counter-pressure on the current collector throughout this step. The resilience of the block of foam will then allow it to expand again and return to its initial shape during the discharge of the battery.

Examples which may be mentioned for resilient foams that can be used are poly(chloroprene) (Neoprene®) foams, preferably the neoprene foams marketed under the name Bulatex®, in particular Bulatex C166, by Hutchinson. Another example of a usable foam having the necessary resilient behavior is the product Sylomer® G, a poly(ether urethane) foam marketed by Plastiform's.

The negative electrode compartment precursor may contain a single negative electrolyte membrane forming or closing a single face of said compartment. This, however, is only one of the two preferred embodiments of the precursor of the present invention, which is represented in appended FIG. 1.

Figure 3:
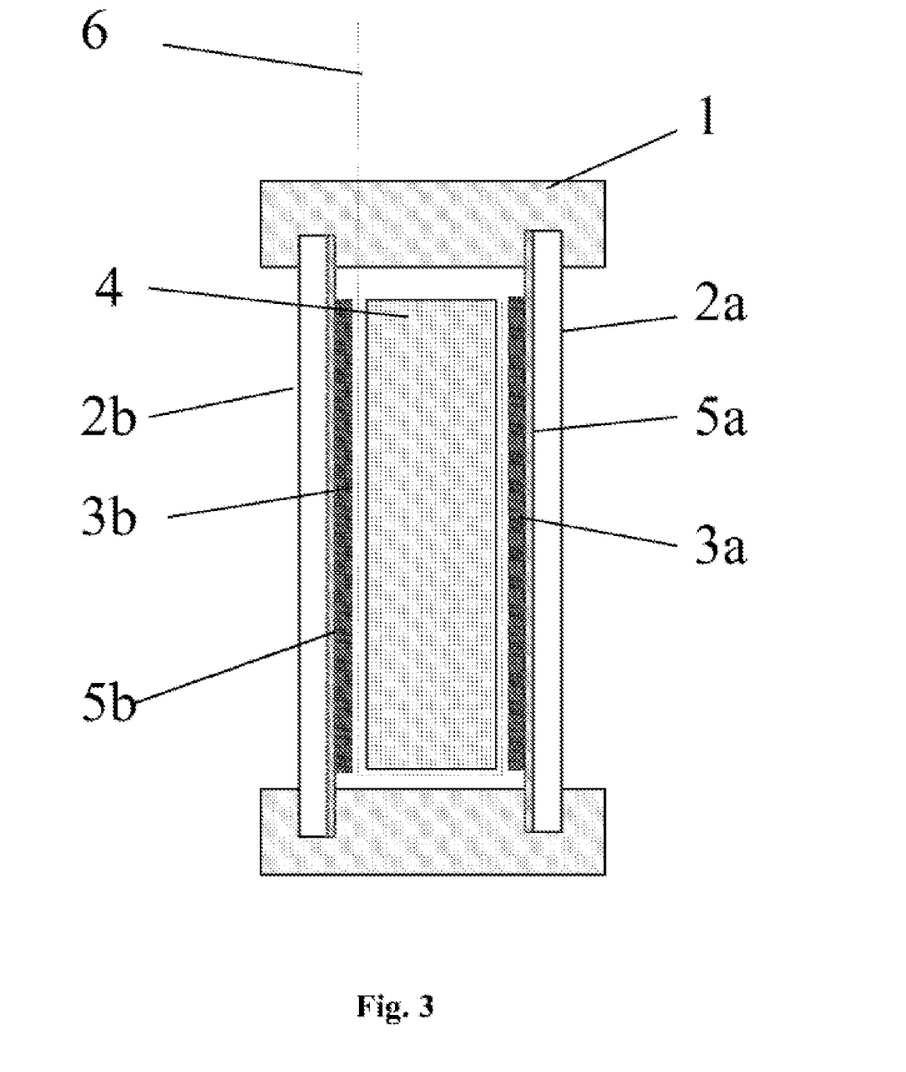
FIG. 3 is a cross section of a double-face negative electrode compartment comprising not one but two solid electrolyte membranes and FIG. 4 represents a rechargeable metal-air battery containing a negative electrode compartment according to the invention.

In another embodiment, which is represented in FIG. 3, the compartment contains two solid electrolyte membranes. These two solid electrolyte membranes form or close two faces of the precursor, preferably two mutually opposite faces. Such a "double-face" compartment containing a double negative electrode may, in a battery, be associated with one or two, preferably two, positive electrode compartments, which constitutes a space saving compared with the first embodiment.

The present invention also relates to a method of manufacturing a negative electrode compartment for rechargeable metal-air batteries, using the compartment precursor described above.

This method comprises the following successive steps (a) bringing some or all of the external surface of the solid electrolyte membrane of a compartment precursor according to the invention in contact with a liquid electrolyte containing cations of the alkali metal which will form the active material of the negative electrode, (b) applying a reducing potential between a negative electrode, formed by the electronic conductor and the current collector, and a positive electrode extending into the liquid electrolyte containing the cations of the alkali metal, (c) maintaining the reducing potential between the negative electrode and the positive electrode for a sufficient time to introduce the desired quantity of alkali metal into the negative electrode compartment precursor, between the current collector and the solid electrolyte membrane.

The liquid electrolyte is preferably an aqueous solution of LiOH when the intention is to manufacture a negative electrode compartment for lithium-air batteries, or an aqueous solution of NaOH when the active metal is sodium. The alkali metal hydroxide concentration in the liquid electrolyte is preferably at least equal to 1 mol·l$^{-1}$ and may range up to saturation or beyond. In fact, the liquid electrolyte may be a saturated solution of alkali metal hydroxide containing alkali metal hydroxide in the solid state. This alkali metal hydroxide will serve as a reserve of alkali metal ions which, after reduction at the time of recharging, form the active metal in the negative electrode compartment.

The positive electrode used for manufacturing the negative electrode compartment may be any metal or alloy which is stable in the aqueous electrolyte and with respect to the potentials for oxidation of the hydroxide ions of the electrolyte to dioxygen. These metals or alloys are for example steel, nickel and platinum.

The reducing potential applied between the negative electrode and the positive electrode is preferably maintained at a value of between −3.5 and −4.4 V. Specifically, this potential must be sufficiently high (negative) for the Li$^+$ to be reduced to Li metal ($E^O$=−3.04 V) and for the hydroxide ions to be oxidized to dioxygen ($E^O$=+0.4 V). This potential is applied for a time and with a current strength which are sufficient to obtain the desired charge, which is preferably between 1 mAh/cm$^2$ and 10 Ah/cm$^2$.

The method of introducing metallic lithium or sodium into the electrode compartment by electrolytic means has the advantage that it can be carried out in an atmosphere which is not controlled (inert, anhydrous), by virtue of the fact that the formation of the metallic lithium or sodium by reduction of the corresponding cations only takes place inside the leak-tight compartment, that is to say while shielded from humidity and air. This is not the case in the method disclosed in WO 2007/021717, which comprises a step of manipulating metallic lithium that categorically needs to be carried out in a dry room or glovebox.

The present invention furthermore relates to a negative electrode compartment obtained or obtainable by the method described above. Further to the technical characteristics of the compartment precursor defined above, such a compartment comprises a layer of active alkali metal, generally lithium or sodium, inserted between the current collector and the protective coating. In this electrode compartment, the block of resilient foam is compressed owing to the presence of this layer of active alkali metal which is introduced during the preparation process.

The negative electrode compartment according to the invention is distinguished from that described in WO 2007/021717 inter alia by the absence of flexible seals, and by the presence of a rigid frame supporting the solid electrolyte and making it possible to reduce the thickness of the latter and thus to improve the electrical efficiency of the battery.

Lastly, the present invention also relates to a rechargeable air-metal battery, comprising:
- a negative electrode compartment as described above,
- a liquid electrolyte formed by a concentrated aqueous solution of a salt of the alkali metal present in the negative electrode compartment, preferably LiOH or NaOH,
- a positive air electrode, and
- a positive oxygen liberation electrode.

The present invention will be described in more detail below with the aid of the appended figures, in which.

Figure 1:
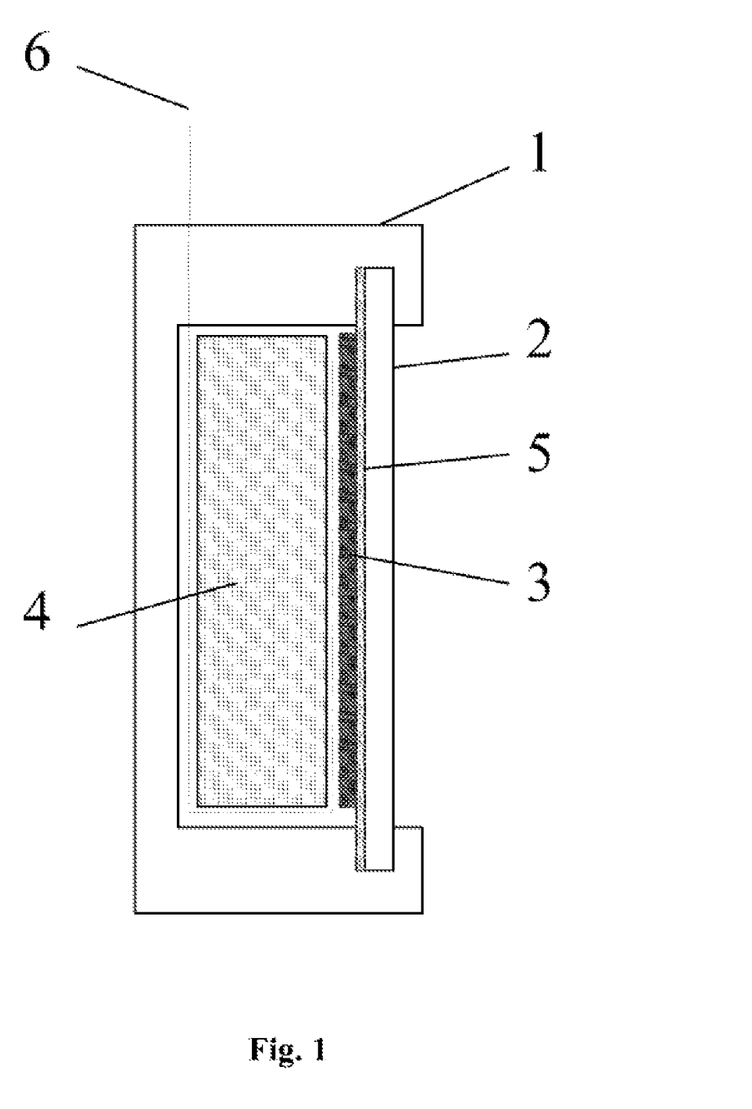
FIG. 1 is a cross section of a negative electrode compartment precursor according to the invention.

The negative electrode compartment precursor represented in FIG. 1 comprises a rigid casing of parallelepipedal shape. This casing is closed on one of its sides by a solid electrolyte membrane 2. The edges of this solid electrolyte membrane are anchored in the resin of the rigid casing. The solid electrolyte membrane 2 is covered over its entire inner surface, that is to say over its entire surface facing the interior of the compartment, with a protective coating that conducts alkali metal ions. Like the solid electrolyte, this coating is anchored in the wall of the rigid casing. A current collector 3 is applied onto this protective coating 5. In contrast to the solid electrolyte membrane and the protective coating, this current collector is not in physical contact with the walls of the casing 1. Almost all of the remaining space is filled with an uncompressed resilient foam 4. An electronic conductor 6 is in physical and electrical contact with the entire surface of the current collector 3. This electronic conductor partially encloses the block of foam 4 and extends through the wall of the casing 1 to outside the compartment.

Figure 2:
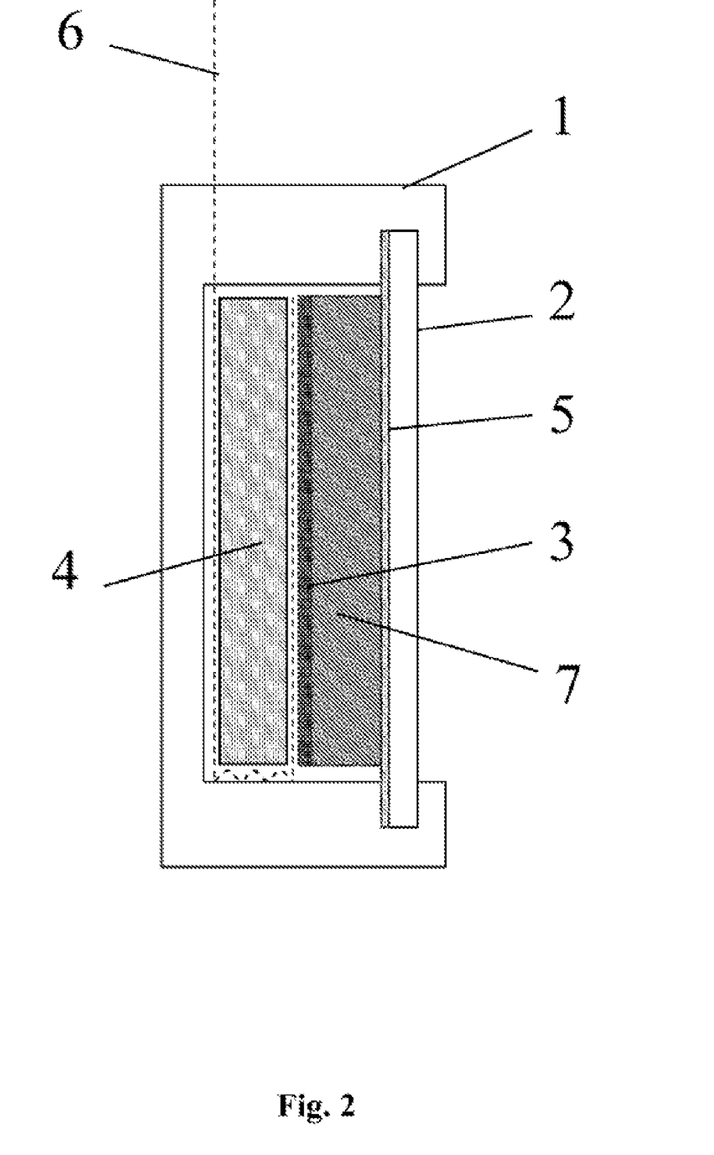
FIG. 2 is a cross section of a negative electrode compartment according to the invention obtained from the precursor represented in FIG. 1.

The negative electrode compartment represented in FIG. 2 was obtained from the precursor of FIG. 1 and consequently contains all the components of the latter, namely the rigid casing 1, the solid electrolyte membrane 2 with the protective coating 5, the current collector 3, the resilient foam 4 and the electronic conductor 6. The essential difference from the precursor of FIG. 1 is the presence of an active metal layer 7, for example metallic lithium, introduced by an electrochemical method from an aqueous electrolyte containing LiOH. The presence of this additional layer leads to compression of the resilient foam 4.

FIG. 3 represents a variant of the negative electrode compartment precursor of FIG. 1, in which each of the two faces of the compartment is formed by a solid electrolyte membrane. This precursor thus has a symmetrical structure, at the center of which lies the block of resilient foam 4, in contact over its two faces with the electronic conductor 6 connected to the two current collectors 3a, 3b. The inner space of the compartment is bounded on two faces by a solid electrolyte membrane 2a, 2b, each of these two membranes being protected over its entire inner surface by a protective coating 5a, 5b.

Figure 4:
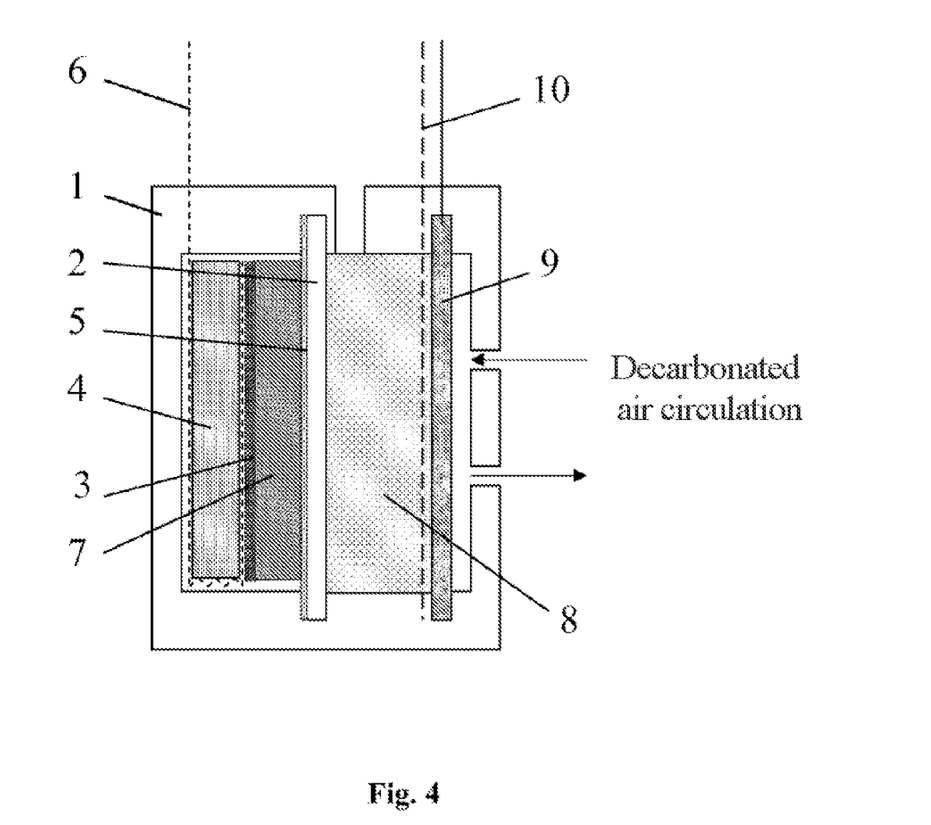

Lastly, FIG. 4 shows an embodiment of a battery containing a negative electrode compartment as represented in FIG. 2. In this battery, the outer face of the solid electrolyte membrane 2 is in contact over its entire surface with an aqueous liquid electrolyte 8, for example a concentrated aqueous solution of LiOH. This liquid electrolyte is in contact with two positive electrodes: an air electrode 9 which is active during the discharging of the battery and an oxygen liberation electrode 10 which will be active during the charging of the battery. The air electrode is a porous electrode in contact with a controlled atmosphere, that is to say with a decarbonated air circuit. This is because the presence of carbon dioxide in air is detrimental to the air electrode since this gas dissolves at the triple point in the basic liquid electrolyte and forms insoluble carbonates which rapidly prevent operation of the air electrode.

EXAMPLE 1

Manufacture of a Negative Electrode Compartment According to the Invention

A solid electrolyte membrane made of LISICON, coated on a single one of its faces with a protective coating made of LiPON, is introduced into a silicone-coated mold having the dimensions of the electrode compartment which is intended to be produced, the current collector made of steel being deposited on this protective coating (generally by evaporation or sputtering). The dimensions of this current collector are less than those of the surface of the LiPON coating.

The two faces of this LISICON/LiPON/current collector assembly are protected beforehand by a sheet of silicone so as to expose only this edges of the structure. Care will be taken here so that the silicone sheet covers an area larger than that of the current collector, in order to prevent the latter from subsequently coming in contact with the resin walls. A cold-curing epoxy resin (Epofix) is mixed with its crosslinker and cast into the silicone-coated mold containing the solid electrolyte membrane covered with the protective coating. The casting of the liquid resin is carried out so that the LISICON/LiPON/current collector structure is held in the resin over its entire periphery. In other words, the liquid resin encloses all the edges of said membrane and, after curing, forms four walls perpendicular to the face formed by the LISICON/LiPON/current collector structure. Of course, the protective silicone sheet is removed at the latest before introduction of the other components of the compartment precursor.

A flexible grid made of steel is bonded onto the current collector (sheet or thin layer of steel) with the aid of a silver varnish. A block of Bulatex C166 neoprene foam (Hutchinson), previously cut to the dimensions of the inner space of the compartment, is next placed on this flexible steel grid. The compartment is then hermetically closed by immersing the still open face of the compartment in a bath of curable liquid resin (Epofix®) while taking care that the electronic conductor passes through this wall formed last.

After curing of the resin, the negative electrode compartment precursor is ready.

The active metal is introduced by electrochemical means during initial charging from an aqueous electrolyte containing LiOH, in contact with the solid electrolyte membrane.

The invention claimed is:

1. A negative electrode compartment precursor for rechargeable metal-air batteries, comprising:
   a rigid resin casing having walls and being open on at least one side,
   at least one solid electrolyte membrane with an inner face that conducts alkali metal ions, which fully closes the at least one open side of the rigid casing in a leaktight manner,
   at least one protective coating which is inert with respect to alkali metal ions, covering at least a portion of the inner face of the solid electrolyte membrane,
   at least one metallic current collector in form of a sheet, coating or thin plate, applied against or deposited on the inner face of the protective coating, said current collector covering a portion of the inner face of this protective coating but without being in contact with the rigid casing on its edges, and
   at least one flexible electronic conductor in the form of a grid or sheet, passing in a leaktight manner through one of the walls of the rigid casing and connected to the current collector.

2. The negative electrode compartment precursor as claimed in claim 1, wherein it contains a single solid electrolyte membrane.

3. The negative electrode compartment precursor as claimed in claim 1, wherein it contains two solid electrolyte membranes, said two solid electrolyte membranes preferably forming two opposite faces of the negative electrode compartment precursor.

4. The negative electrode compartment precursor as claimed in claim 1, further comprising at least one block of resilient material applied against the current collector and filling essentially all of an inner space defined by the walls of the rigid casing and the solid electrolyte, said block exerting a slight pressure on the current collector so as to keep the current collector applied against the solid electrolyte membrane.

5. The negative electrode compartment precursor as claimed in claim 4, wherein the resilient material is a poly (chloroprene) foam.

6. The negative electrode compartment precursor as claimed in claim 4, further comprising a layer of active alkali metal inserted between the current collector and the protective coating, and in that the resilient material is compressed.

7. The negative electrode compartment precursor as claimed in claim 1, wherein the solid electrolyte membrane is a ceramic membrane which conducts sodium ions or lithium ions.

8. The negative electrode compartment precursor as claimed in claim 1, wherein the solid electrolyte membrane is a ceramic membrane of formula $$Li_{1-x}(M,Ga,Al)_x(Ge_{1-y}Ti_y)_{2-x}(PO_4)_3$$

wherein $0 \leq y \leq 1$ and $0 \leq x \leq 1$;
M is one or more metals selected from Nd, Sm, Eu, Gd, Tb, Dy, Ho, Er, Tm and Yb, or a ceramic membrane of formula $$Na_{1+x}Zr_2S_xP_{3-x}O_{12}$$

where $0 \leq x \leq 3$.

9. The negative electrode compartment precursor as claimed in claim 1, wherein the solid electrolyte membrane has a thickness of between 30 and 500 µm.

10. The negative electrode compartment precursor as claimed in claim 1, wherein the solid electrolyte membrane is supported by a reinforcing structure which leaves the majority of the surface area of the membrane free.

11. The negative electrode compartment precursor as claimed in claim 1, wherein the protective coating is a coating based on $Li_3N$, $Li_3P$, LiI, LiBr, LiF, lithium phosphorus oxynitride (LiPON) or sodium phosphorus oxynitride (NaPON), preferably a LiPON or NaPON coating.

12. The negative electrode compartment precursor as claimed in claim 1, the metallic current collector and the flexible electronic conductor contacts one another at a contact region and wherein a silver varnish is applied on the contact region.

13. The negative electrode compartment precursor as claimed in claim 1, wherein the rigid casing is made of thermosetting or cold-curing resin.

14. The negative electrode compartment precursor as claimed in claim 1, wherein the solid electrolyte membrane has a thickness of between 50 and 160 µm.

15. A method of manufacturing a negative electrode compartment for rechargeable metal-air batteries, comprising:
   a rigid resin casing having walls and being open on at least one side,
   at least one solid electrolyte membrane with an inner face that conducts alkali metal ions, which fully closes the at least one open side the rigid casing in a leaktight manner,
   at least one protective coating which is inert with respect to alkali metal ions, covering at least a portion of the inner face of the solid electrolyte membrane,
   at least one metallic current collector in form of a sheet, coating or thin plate, applied against or deposited on the inner face of the protective coating, said current collector covering a portion of the inner face of this protective coating but without being in contact with the rigid casing on its edges, and
   at least one flexible electronic conductor in the form of a grid or sheet, passing in a leaktight manner through one of the walls of the rigid casing and connected to the current collector; the steps comprising:
   bringing some or all of an external surface of the solid electrolyte membrane of a compartment precursor in contact with a liquid electrolyte containing cations of the alkali metal which will form the active material of the negative electrode,
   applying a reducing potential between the negative electrode, formed by the electronic conductor and the current collector, and a positive electrode extending into the liquid electrolyte containing the cations of the alkali metal, and
   maintaining the reducing potential between the negative electrode and the positive electrode for a sufficient time to introduce the desired quantity of alkali metal into the negative electrode compartment precursor, between the current collector and the solid electrolyte membrane.

16. The manufacturing method as claimed in claim 15, wherein the liquid electrolyte is an aqueous solution of LiOH or NaOH.

17. The manufacturing method as claimed in claim 15, wherein the potential between the negative electrode and the positive electrode is maintained at a value of between −3.5 and −4.4 V.

18. A rechargeable air-metal battery, comprising:

a negative electrode compartment comprising a rigid resin casing having walls and being open on at least one side open on at least one side, at least one solid electrolyte membrane with an inner face that conducts alkali metal ions, which fully closes the at least one open side of the rigid casing in a leaktight manner, at least one protective coating which is inert with respect to alkali metal ions, covering at least a portion of the inner face of the solid electrolyte membrane, at least one metallic current collector in form of a sheet, coating or thin plate, applied against or deposited on the inner face of the protective coating, said current collector covering a portion of the inner face of this protective coating but without being in contact with the rigid casing on its edges, and at least one flexible electronic conductor in the form of a grid or sheet, passing in a leaktight manner through one of the walls of the rigid casing and connected to the current collector;

at least one block of resilient material applied against the current collector and filling essentially all of the inner space defined by the walls of the rigid casing and the solid electrolyte, said block exerting a slight pressure on the current collector so as to keep the current collector applied against the solid electrolyte membrane;

a layer of active alkali metal inserted between the current collector and the protective coating, and in that the resilient material is compressed;

a liquid electrolyte formed by a concentrated aqueous solution of a salt of the alkali metal present in the negative electrode compartment;

at least one positive air electrode; and at least one positive oxygen liberation electrode.

* * * * *